United States Patent [19]

Staton et al.

[11] Patent Number: 5,106,065
[45] Date of Patent: Apr. 21, 1992

[54] SELF-BLOCKING GAS SPRING WITH TEMPERATURE-RESPONSIVE BYPASS VALVE

[75] Inventors: Richard D. Staton, Collingswood, N.J.; Robert G. Zambelli, Sellersville, Pa.

[73] Assignee: Fichtel & Sachs Industries, Inc., Colmar, Pa.

[21] Appl. No.: 671,016

[22] Filed: Mar. 18, 1991

Related U.S. Application Data

[63] Continuation-in-part of Ser. No. 570,416, Aug. 21, 1990, abandoned, which is a continuation-in-part of Ser. No. 405,468, Sep. 11, 1989, abandoned.

[51] Int. Cl.⁵ ................................................ F16F 9/02
[52] U.S. Cl. ........................... 267/64.11; 188/269; 188/276; 188/277; 188/322.22; 267/120; 267/124
[58] Field of Search ............... 267/64.11–64.28, 267/120, 124, 129; 188/276, 277, 278, 322.22, 322.15, 281, 282, 269, 284, 322.13, 316, 318; 16/66–70, 84, 85, 289, 52

[56] References Cited

U.S. PATENT DOCUMENTS

| | | | |
|---|---|---|---|
| 3,913,170 | 10/1975 | Nakane et al. | 16/52 X |
| 3,958,672 | 5/1976 | Keilholz | 188/277 |
| 4,108,423 | 8/1978 | Skubal | 188/276 X |
| 4,148,111 | 4/1979 | Lieberman | 16/84 X |
| 4,337,849 | 7/1982 | Siorek et al. | 188/277 X |
| 4,408,751 | 10/1983 | Dodson et al. | 188/277 X |
| 4,423,800 | 1/1984 | Kobiske et al. | 188/277 |
| 4,651,979 | 3/1987 | Freitag et al. | 188/276 X |
| 4,785,921 | 11/1988 | Hosan et al. | 188/276 X |
| 4,958,706 | 9/1990 | Richardson et al. | 188/277 X |

Primary Examiner—Douglas C. Butler
Attorney, Agent, or Firm—Brumbaugh, Graves, Donohue & Raymond

[57] ABSTRACT

A gas spring comprises a first bypass with a one-way valve that allows fluid to bypass the piston when the piston moves outward, a second bypass with a spring-biassed valve that allows fluid to bypass the piston when the piston is pushed inward with a force exceeding the combined gas-spring and spring-biased valve forces, and a third bypass having a temperature-responsive valve that allows fluid to bypass the piston when the rod is pushed in but only when the temperature of the gas exceeds a selected level.

17 Claims, 3 Drawing Sheets

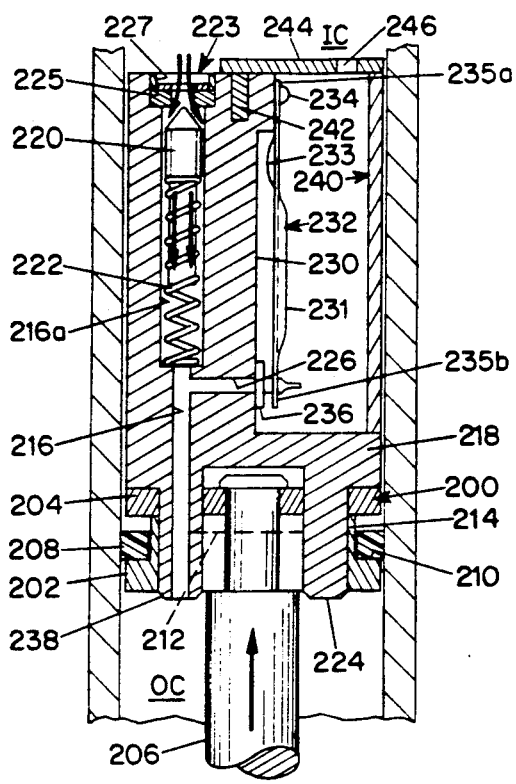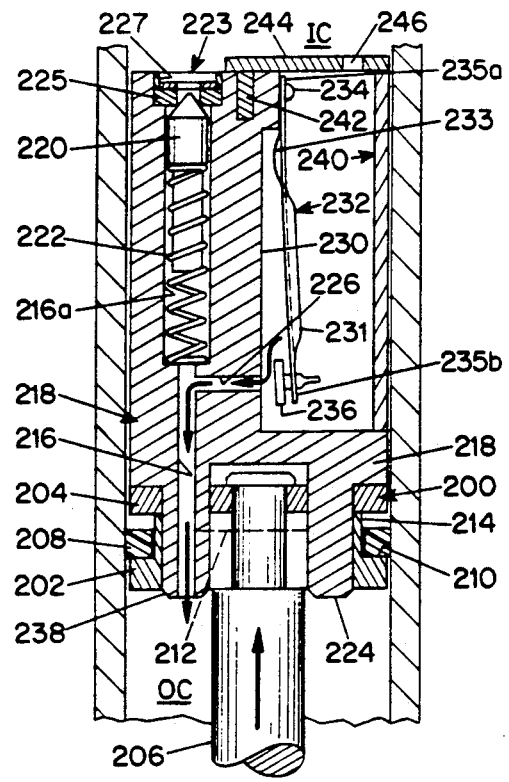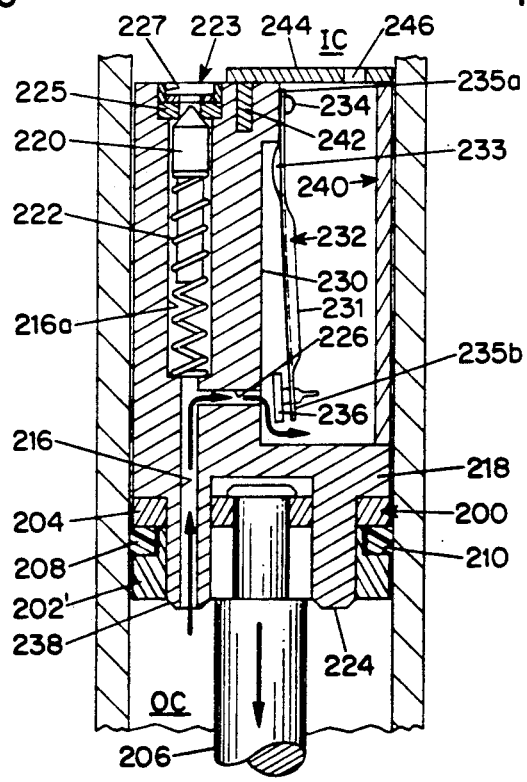

SELF-BLOCKING GAS SPRING WITH TEMPERATURE-RESPONSIVE BYPASS VALVE

This application is a continuation-in-part of U.S. patent application Ser. No. 07/570,416 filed Aug. 21, 1990, now abandoned, which is a continuation-in-part of U.S. patent application Ser. No. 07/405,468 filed Sept. 11, 1989, now abandoned.

BACKGROUND OF THE INVENTION

Gas springs are widely used to counterbalance the engine compartment hoods, trunk lids, rear windows, and tailgates of passenger cars, station wagons, and vans to facilitate opening them and to hold them open at or near a fully open position. It is well known that the force outputs of gas springs vary with the temperature of the gas (Boyle's law); at low temperatures the gas spring produces a force that is significantly less than the force produced at high temperatures. It is necessary, therefore, to design the gas spring so that it produces a sufficient force to hold the hood, trunk lid or the like (hereinafter referred to as the "load") open at a suitably selected low temperature, for example, $-30°$ C. (Conventionally, the gas spring is designed to produce a force of about one to five pounds over the load at the hold-open position of the load at, say, $-30°$ C.) At high temperatures, the increase in the force output at the hold-open position may be as much as, say, 50 pounds, which means that the force required to move the load from the hold-open position toward closed ("handle load") is 50 pounds. A handle load of that magnitude is obviously undesirable.

SUMMARY OF THE INVENTION

An object of the present invention is to provide a gas spring in which the difference between the handle loads at low and high ambient temperatures is significantly reduced, as compared to previously known gas springs. The present invention is an improvement in a gas spring of the type having a spring-biassed check valve that closes a bypass across the gas spring piston against fluid flow from the closed end compartment to the rod end compartment. In a gas spring of this type, the force of the gas spring opposing closing of the load is the total of the force due to gas pressure acting on the piston rod (the normal gas spring force) and a force required to cause the spring-biassed valve to open.

There is provided, in accordance with the present invention, a gas spring having a cylinder member defining a chamber, a closure at one end of the cylinder, a piston rod received in sealed relation to the cylinder member at the other end of the cylinder member and movable toward and away from the closure, and a piston affixed to the piston rod within the chamber and separating the chamber into an inward compartment adjacent said one end of the cylinder and an outward compartment adjacent said other end of the cylinder. The volumes of the compartments vary in accordance with the position of the piston. The chamber contains a liquid and a gas under a pressure higher than atmospheric pressure. A first bypass allows the liquid and gas to flow from the outward compartment to the inward compartment when the piston and rod move in the direction of the outward compartment in response to forces imposed on the rod in the outward direction. In one embodiment, a one-way valve closes the first bypass to prevent flow of gas and liquid therethrough from the inward compartment to the outward compartment at all temperatures. In a second embodiment, such valve closes the first bypass to such outward fluid flow only when the temperature is below a predetermined value. A second bypass permits the gas and liquid to flow from the inward compartment to the outward compartment upon movement of the rod member toward the inward compartment, and a spring-biassed one-way valve associated with the second bypass prevents flow therethrough in the absence of a predetermined pressure difference between the fluids in the inward and outward compartments.

In accordance with another feature of the present invention, there are a third bypass for permitting liquid and gas to flow from the inward compartment to the outward compartment and a temperature-responsive valve associated with the third bypass for closing it when the temperature of the gas spring is less than a predetermined temperature and opening it when the temperature of the gas spring is greater than a predetermined temperature. The third bypass and associated temperature-responsive valve may be separate from the first and second bypasses or they may be incorporated into one or both of such other bypasses. For example, in the first embodiment referred to above in which the one-way valve closes the first bypass at all temperatures, the first and third bypasses and their associated valves are entirely separate. In the second embodiment in which the one-way valve closes the first bypass against outward fluid flow at temperature below a predetermined temperature, the first and third bypasses are combined and the temperature-responsive valve of the third bypass also functions as the one-way valve of the first bypass. Preferably, the temperature-responsive valve comprises a port in the third (or first) bypass that opens to the closed-end or inward compartment of the gas spring and a bimetal port-closure element that closes the port at a selected temperature.

In one embodiment the third bypass extends through a portion of the piston rod adjacent the piston, the port orifice is within a cup-like valve support attached to the piston rod, and the bimetallic element is a disk mounted on a flange portion of the support. The third bypass includes at least one opening in the support in a portion of the support between the disk and the port.

In other embodiments, a valve body is joined to the side of the piston facing the inward compartment, the third bypass includes a passage through the piston and the valve body that opens at a port in a face of the valve body, and the temperature-responsive valve means includes a bimetallic element in the form of an elongated band secured at one end to the valve body at a location remote from the port and having a seal element at its other end positioned to seat in sealing relation against a surface of the valve body adjacent the port. In one such embodiment, the surface of the valve body against which the seal element seats is oriented obliquely to the axis of the cylinder member and is located proximate to one side of the cylinder member, and the bimetallic element extends substantially diametrically of the cylinder member obliquely to the axis of the cylinder member. In another such embodiment, the surface of the valve body against which the seal element seats extends axially, and the bimetallic element extends substantially axially of the cylinder member. The second bypass includes a passage through the piston and the valve body opening at a port in a wall of the valve body in the inward compartment, and the spring-biassed one-way valve is received within a portion of the passage within the valve body.

In another such embodiment, the first and third bypasses are combined, and the temperature-responsive valve functions to permit fluid flow inwardly through the bypass but prevents outward fluid flow through such bypass when the temperature is below a predetermined value.

When the gas spring holds the load open at a temperature below that at which the temperature-responsive valve opens, the force of the gas spring is the total of the normal gas spring force and the force required to cause the spring-biassed one-way valve to open. When the temperature-responsive valve opens (at a predetermined temperature based on its design), the third bypass allows liquid and gas to flow relatively freely from the inward compartment to the outward compartment. The force of the gas spring is the force due to gas pressure alone (the normal gas spring force); the spring-biassed check valve is circumvented. For a better understanding of the invention, reference may be made to the following description of exemplary embodiments, taken in conjunction with the accompanying drawings.

DESCRIPTION OF THE DRAWINGS

FIGS. 6 and 7 are axial cross sectional views as in FIGS. 4 and 5, respectively, but of a third embodiment; and FIG. 8 is an axial cross sectional view identical to FIG. 6 except that the seal ring of the piston assembly is fixed axially.

DESCRIPTION OF THE EMBODIMENTS

Figure 1:
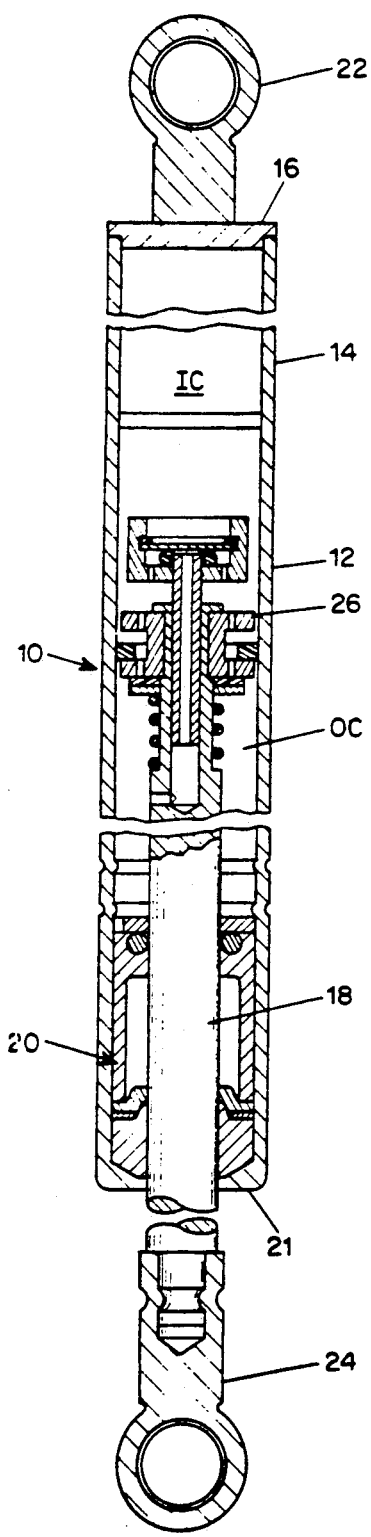
FIG. 1 is an axial cross-sectional view of one embodiment.
Figure 2:
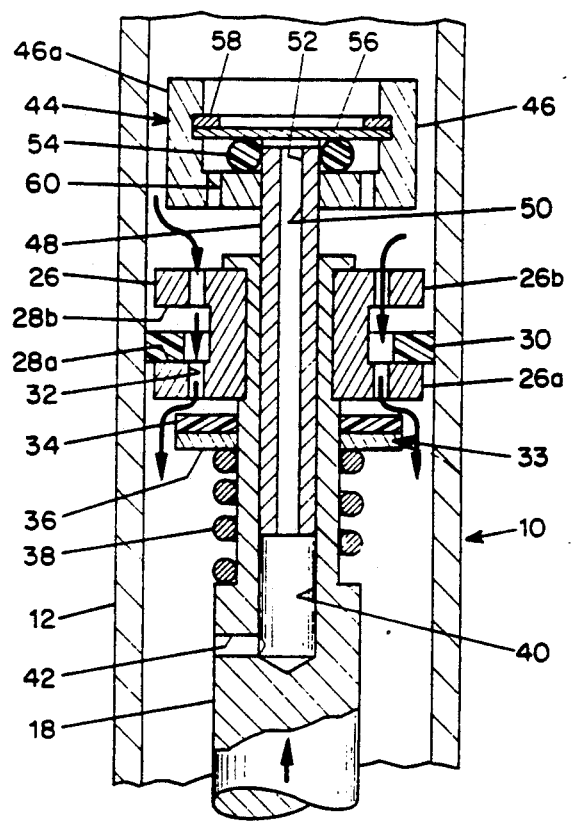
FIGS. 2 and 3 are axial cross-sectional views of the piston portion of the embodiment of FIG. 1 showing the check-valve bypass mode and temperature-responsive bypass mode, respectively.
Figure 3:
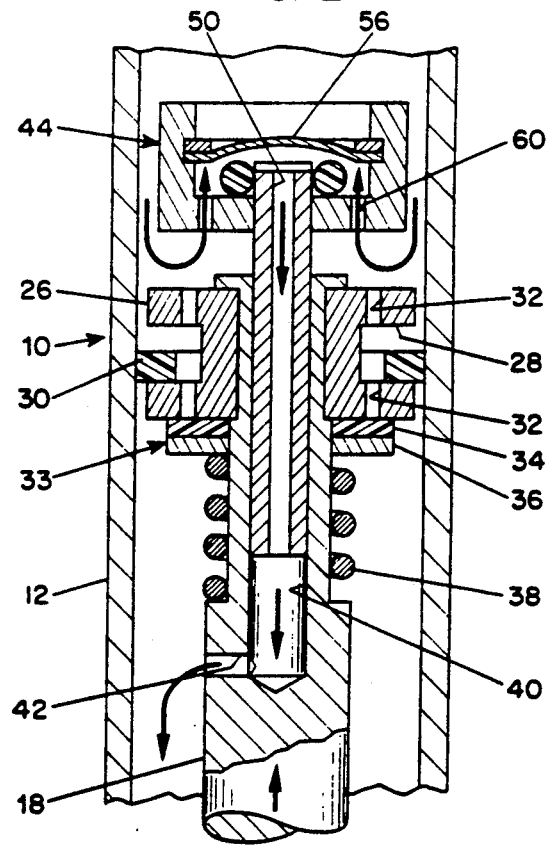

The gas spring 10 of FIGS. 1 to 3 comprises a circular-cylindrical tube (cylinder) 12 that is closed at one end by a cap 16. A piston rod 18 extends into the cylinder 12 through a seal assembly 20 in the rod end 21 of the cylinder. Fittings 22 and 24 are fastened to the cap 16 and piston rod 18, respectively, for connecting the gas spring to the vehicle body and the load (hood, trunk lid and the like).

A piston 26 is fastened to the end of the piston rod within the cylinder 12 and divides the chamber within the cylinder into two compartments, the volumes of which vary according to the position of the piston. There is an inward compartment IC between the piston and the cap 16 and an outward compartment OC between the piston and the seal assembly 20.

The peripheral surface of the piston 26 is in clearance with the inner wall of the cylinder 12. A ring groove 28 receives an elastomeric piston ring 30 that rides in sealing engagement with the wall of the cylinder 12. The ring 30 can move axially in the ring groove 28, assuming the position, shown in the drawings, in engagement with the lower shoulder or land 28a of the groove when the rod is pushed in toward the inward compartment IC and moving into engagement with the upper shoulder or land 28b when the rod is pulled out toward the outward compartment OC. Movement of the ring 30 relative to the groove 28 is caused by friction forces between the ring and the cylinder wall.

Most of the free volume of the cylinder chamber contains air or nitrogen at a pressure of from about 300 to 4500 psi. The remainder contains a liquid, such as hydraulic brake fluid. Several holes 32 transect the piston and open into the ring groove 28. When the piston moves outward to reduce the volume of the outward compartment OC, the liquid and gas in the chamber bypass the piston and flow from the outward compartment to the inward compartment through a first bypass consisting of the annular clearance between the lower flange 26a and the cylinder wall, the then open space between the shoulder 28a and the piston ring 30, and the holes 32 in the piston upper flange 26b.

The gas spring has a spring-loaded one-way check valve 33, which consists of an elastomeric sealing ring 34, a metal back-up washer 36 and a biasing compression spring 38 located on the piston rod 18, on the outward side of the piston. The sealing ring 34 closes the holes 32 in the outward flange 26a of the piston and prevents the liquid and gas in the cylinder chamber from bypassing the piston through the holes 32 in the outward flange 26a when the piston is pushed inward by a force that is less than the total of the force due to the pressure of the gas in the chamber and the force required to unseat the check valve from the holes 32. The unseating force is a function of the force of the spring 38, the total area of the holes 32 and the pressure difference across the sealing ring 34.

As described to this point, the gas spring 10 is well-known in the prior art. When the rod 18 is extended to hold the load open, the liquid covers the piston—the gas spring is designed to be used with the rod end down in the extended, load-holding condition. (The liquid provides a good seal at rings 30 and 34, whereas gas can leak and allow the load to slowly fall.) After the user lifts the load, assisted by the gas spring force, and releases the load, the load will fall a short distance, and the rod will move into the cylinder far enough to move the piston 26 relative to the piston ring 30 (which remains stationary due to friction with the cylinder wall) and seat the ring 30 on the lower land 28a of the ring groove, thereby closing the first bypass; the piston ring constitutes, in this respect, a one-way valve for the first bypass. At this point, a second bypass across the piston, which includes the holes 32, is closed by the spring-biassed valve 33. The load will continue to fall until the rod and piston move far enough into the cylinder to produce a pressure increase in the inward compartment IC and a pressure drop in the outward compartment OC such that the pressure differential across the piston applies an outward force on the piston and rod equal to the difference between the load and the gas spring force, at which point the load is fully counter-balanced by the gas spring.

The spring-biased valve 33 is designed to remain closed until the force applied to the rod, when the gas temperature is at the selected low value (e.g., 30° C.), slightly (e.g., 1 to 5 pounds) exceeds the load. At the low design temperature, the excess is the handle load required to move the load from the checked position. At higher temperatures, the handle load becomes greater, because the normal gas spring force increases with increasing temperature. The force increment added by the spring-biassed bypass valve (hereinafter called "valve force") is essentially constant at all temperatures.

When a sufficient handle load is applied to the load to overcome the total force output of the gas spring (normal gas spring force plus valve force), the spring-biassed valve opens and allows the liquid and gas to flow through the bypass holes 32, as shown in FIG. 2. To prevent the handle load from becoming undesirably large when the gas spring is hot (which can result from a high ambient temperature, heating by the sun or engine heat), the invention provides for circumventing the valve force when the gas spring is heated to a temperature above a selected value.

A hole 40 is drilled axially in the inward end portion of the piston rod to a point on the outward side of the piston 36, and one or more radial holes 42 are drilled to intersect the axial hole. These holes (40, 42) provide a third bypass between the inward chamber IC and the outward chamber OC that is functionally in parallel with the second bypass controlled by the check valve 33. A temperature-responsive valve 44 is installed in the third bypass. It comprises a cup-like support 46, a mounting tube 48 received and secured in the hole 40 and having a passage 50 that terminates at a port 52, a sealing gasket 54, and a bimetallic disk 56 that is held in place by a split ring 58 on the flange portion 46a of the support 46. One or more holes 60 in the base of the support 46 communicate the part of the support within the disk to the inward compartment IC of the gas spring chamber.

When the temperature of the bimetallic disk is relatively low, it assumes a flat or slightly dished shape (FIG. 2) such that it is biased resiliently into engagement with the gasket 54, thus closing the port 52 and preventing liquid and gas from flowing through the third bypass (passages 50, 40, 42). When it is heated to a temperature above a selected value, it inverts to the oppositely dished shape shown in FIG. 3, which opens the port 52 and allows liquid in the inward chamber to flow into the outward chamber along the bypass path shown by the arrows. In the open condition of the temperature-responsive valve 44, only the gas spring force resists movement of the piston rod in the inward direction. Accordingly,, the bimetallic disk 56 is designed to invert and open the port when the temperature of the gas spring is sufficiently high so that the gas spring force exceeds the load, thus retaining the blocking function at a moderate temperature at and near the temperature when the valve pops open. Elimination of the valve force, however, reduces the handle load that the user has to exert to move the load toward closed when the gas spring is hot. Typically, the temperature-responsive valve will be designed to open at roughly 0° C.

As is known per se, a portion 14 (FIG. 1) of the cylinder adjacent the cap may be of a larger diameter than the O.D. of the piston ring 30 to allow bypass of liquid and gas by circumventing the second bypass at low temperatures, thereby eliminating the valve force near closing of the load. At higher temperatures, the temperature-responsive valve circumvents the second bypass and eliminates the valve force over the entire stroke of the piston, so an enlarged section of the cylinder is unnecessary. Indeed, the present invention eliminates the need for force release near closure in many cases when it might otherwise be called for.

Figure 4:
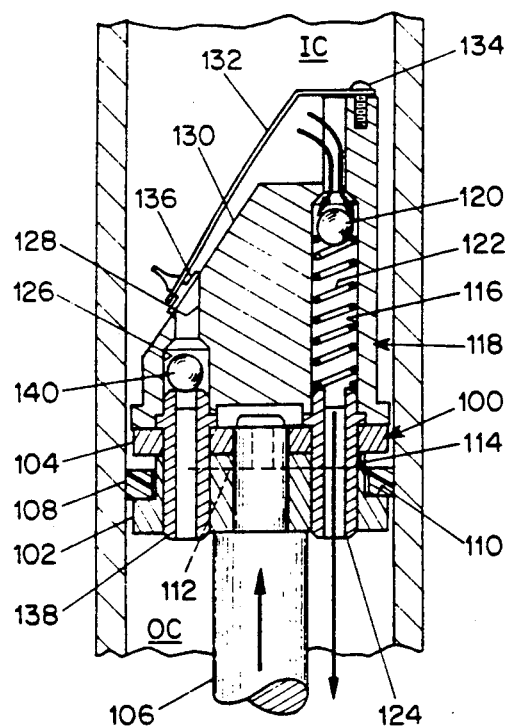
FIGS. 4 and 5 are axial cross-sectional views of the piston portion of a second embodiment in the check-valve bypass mode and the temperature-responsive bypass mode, respectively.
Figure 5:
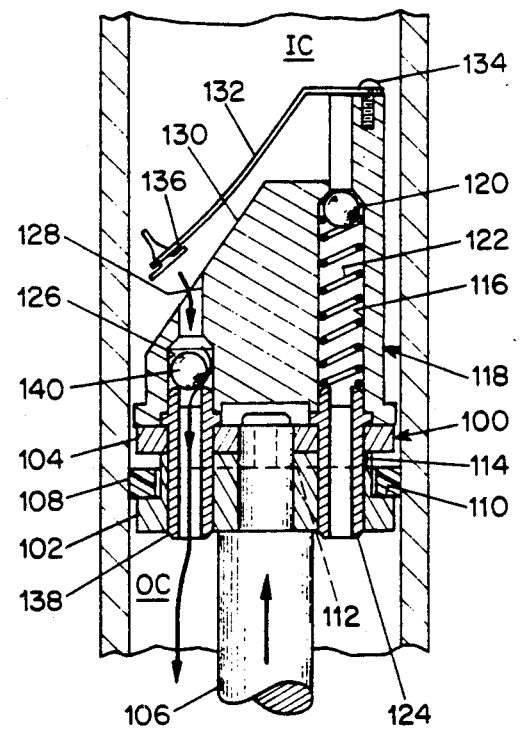

The embodiment of FIGS. 4 and 5 is functionally substantially identical to the embodiment of FIGS. 1 to 3 but is constructed somewhat differently. A piston assembly 100, which consists of a piston member 102 and a washer member 104, is received on the end of a piston rod 106 and receives a sealing ring 108 in a ring groove 110. The first bypass, which allows fluid to flow from the outward compartment OC to the inward compartment IC when the piston rod is moving out of the cylinder member but is closed to flow in the other direction by the sealing ring, is a labyrinthine groove 112 formed in the face of the piston member 102 that opens into the base of the ring groove 110. When the piston rod is moving out of the cylinder, the sealing ring shifts upwardly in the ring groove and allows fluid to enter the inlet end 114 of the groove 112. The outlet end of the groove opens to a hole in the washer member that leads to the inward compartment. When the rod is moving into the cylinder, as shown in FIGS. 4 and 5, the sealing ring seats in the lower shoulder of the ring groove and prevents fluid from flowing through the first bypass. Bypasses based on labyrinthine grooves are well-known per se and are provided to control the velocity of the piston/rod when it moves in the rod-out direction.

The second bypass, which incorporates a spring-biassed one-way valve, is a passage 116 that extends through the piston assembly and through a valve body 118 that is attached to the piston assembly on the inward compartment side. The valve is a spring-loaded ball check valve, consisting of a ball 120 and a spring 122, and is installed in the valve body 118. A tubular port member 124 press-fitted into the passage 116 provides a seat for the spring and mechanically secures the valve body to the piston assembly.

The temperature-responsive bypass comprises a passage 126 through the piston assembly and the valve body that opens at a port 128 in a surface 130 of the valve body oriented obliquely to the axis of the cylinder. A bimetallic element in the form of a strip or band 132 is fastened, such as by screws 134, at one end to the valve body and receives at its other end a seal element 136, which is pressed into a hole in the band. The bimetallic band 132 extends substantially diametrically and obliquely across the cylinder, this arrangement allowing the band to be relatively long and, therefore, to be designed to be highly accurate in its temperature response. A tubular port member 138 received in the passage 126 retains a ball 140 of a one-way check valve that prevents fluid from flowing through the third bypass when the piston rod is moving out of the cylinder. The port member is press-fitted into holes in the piston and the valve body and mechanically joins the valve member to the piston.

When the piston rod is moving out of the cylinder against the force of a load, the ball valves 120 and 140 close the second and third bypasses, and fluid flows past the piston from the outward to the inward compartment only through the labyrinthine first bypass 112, which is designed to throttle the fluid flow and limit the speed of rod-out movement of the rod. When the temperature of the bimetallic band 132 falls to a predetermined value built into it by design, the seal element 136 is held against the surface 130 of the valve body, as shown in FIG. 4, thereby forming a face seal that prevents the fluids in the gas spring from flowing through the third bypass from the inward to the outward compartment when the piston rod is moved into the cylinder. In this state the force resisting the movement of the rod into the cylinder is the total of the force generated by the gas and the force required to open the valve 120, 122, the latter force supplementing the former at low temperatures to provide a hold-open force. At temperatures above the design value of the bimetallic band seal element 136 is unseated from the surface 130, as shown in FIG. 5, the band 132 inverting from its low temperature state and thereby opening the third bypass (the passage 126) to permit fluid to flow through it from the inward to the outward compartment. Because the flow through the third bypass is essentially unrestricted, the second bypass becomes inoperative, and the force of the spring-loaded valve 120, 122 does not impede inward movement of the piston rod.

A further embodiment of the invention is shown in FIGS. 6 and 7. It, too, is functionally substantially identical to the embodiment of FIGS. 1 to 3, although differing therefrom in structural detail. In FIGS. 6 and 7, the piston assembly 200, including the piston member 202, the washer member 204, and the seal ring 208, and its manner of attachment to the piston rod 206 are the same as in the embodiment of FIGS. 4 and 5. The first bypass structure, including the ring groove 210, the labyrinthine groove 212 and the inlet end 214, is likewise identical, both structurally and functionally, to that of FIGS. 4 and 5.

The second bypass in FIGS. 6 and 7 comprises an axially extending passage 216 in an integrally formed valve body 218 that is attached to the piston assembly 200 on the inward compartment side. To that end, cylindrical studs 224 and 238 formed on the valve body 218 are press fitted into matching bores in the piston assembly to secure the valve body in place. The passage 216 is enlarged over an inner portion 216a of its length for receipt of a spring-biased one way valve, consisting of a check valve body 220 and a coil spring 222. At the inner end, the passage 216a is further enlarged for receipt of an annular valve seat 223 comprising a nitrile seal 225 molded onto a metal retainer 227. With this arrangement, the spring 222, one-way valve body 220, and valve seat 223 may be top loaded into the valve body 218, thereby simplifying assembly. The seal 225 and the retainer 227 have a central bore which defines a port through which the passage 216 opens to the inner compartment.

The temperature-responsive bypass comprises a transverse passage 226 in the valve body 218 that opens through an axially extending surface 230 of the valve body. Preferably, the surface 230 is substantially parallel to and aligned with the axis of the cylinder member. A bimetallic element in the form of a strip or band 232 is fastened at one end, e.g., by screws or rivets 234, to the valve body 218 adjacent its inner end. At the other end, the bimetallic element carries a seal element 236, which is press fitted into a hole in the bimetallic element. In this arrangement, the configuration of the bimetallic element 232 is simplified relative to that of FIGS. 3 and 4 by eliminating the bend along the oblique valve body surface 130. To provide greater structural rigidity and accuracy in its temperature response, the bimetallic element 232 preferably has a shallow U-shaped cross section over an axially outer portion 231 of its length and a spherically indented portion 233 adjacent its axially inner end. The two axially end portions 235a and 235b are preferably flat. As will be understood, the bimetallic band 232 presses the seal element 236 against the opening of passage 226 to prevent fluid flow therethrough (in the outward direction) so long as the ambient temperature is below the predetermined response temperature of the band 232.

Preferably, a protective cap 240 is attached to the valve body 218, e.g., by press fitted studs 242 (only one of which is shown), to cover the bimetallic band 232. The cap 240 preferably is U-shaped in transverse cross section and includes an end wall 244 so as completely to surround the band 232. An axial opening 246 is formed in the end wall 244 to permit fluid flow thereacross.

When the piston is moving out of the cylinder against the force of a load, the valve body 220 closes the second bypass passage 216, and fluid flows past the piston from the outward to the inward compartment through the labyrinthine first bypass 212, as described in connection with the embodiment of FIGS. 4 and 5. Inward fluid flow may also occur through the passage 226, causing the seal element 236 to lift away from the surface 230.

So long as the ambient temperature is below the response temperature of the bimetallic band 232, the seal element 236 will remain seated against the surface 230, as shown in FIG. 6, in the absence of a pressure differential acting inwardly across the seal element 236. Thus at temperatures below the design temperature of the bimetallic band 232 the seal element 236 functions as a one way valve to permit inward fluid flow but not outward fluid flow through the passage 226. In this case, outward fluid flow (inward movement of the piston rod) can occur only if sufficient handle force is applied to overcome the spring-biassed valve 220, as shown in FIG. 6. When the ambient temperature is above the response temperature of the bimetallic element 232, the seal element 236 is unseated by the action of the bimetallic band 232, as shown in FIG. 7, and substantially unimpeded outward fluid flow through passages 226 and 216 is possible. In this case, the spring-biased valve of the second bypass is circumvented and does not impede inward movement of the piston rod.

This dual function of the passage 226 and the bimetallic element 232 (i.e., as both (1) the first bypass and its associated valve for permitting fluid flow from the outer compartment to the inner compartment but preventing fluid flow from the inward compartment to the outward compartment except when the temperature is above the predetermined response temperature and (2) as the third bypass and its associated temperature-responsive valve for permitting fluid flow from the inner compartment to the outer compartment when the temperature is above such predetermined response temperature) has the advantage of permitting a further simplification of the embodiment of FIGS. 6 and 7. Thus as shown in FIG. 8, the seal ring 208 need not be axially movable to function as a one-way check valve and the labyrinthine groove 212 may be eliminated. In FIG. 8, the piston member 202' is axially enlarged relative to the thickness of the piston member 202 in FIGS. 6 and 7 so as to capture the ring seal 208 against the disk 204.

We claim:

1. A gas spring having a cylinder member defining a chamber and having a central longitudinal axis and a first end and a second end, a closure at the first end of the cylinder member, a piston rod received in sealed relation to the cylinder member at the second end of the cylinder member and movable toward and away from the closure, a piston affixed to the piston rod within the chamber and separating the chamber into an inward compartment adjacent the first end of the cylinder member and an outward compartment adjacent the second end of the cylinder member, the volumes of the compartments varying in accordance with the position of the piston, a mass of a liquid and a mass of gas under a pressure higher than atmospheric pressure contained in the chamber, means defining a first bypass for allowing the liquid and gas to flow from the outward compartment to the inward compartment when the piston and rod move toward the outward compartment in response to forces imposed on the rod, a one-way valve for closing the first bypass to prevent flow of gas and liquid therethrough from the inward compartment to the outward compartment, a second bypass for permitting the gas and liquid to flow from the inward compartment to the outward compartment upon movement of the rod toward the inward compartment, and a spring-biassed one-way valve associated with the second bypass for preventing flow therethrough when the difference between the pressure of the liquid and gas in the inward compartment and the pressure of the liquid and gas in the outward compartment is less than a predetermined amount characterized in that there are a third bypass for permitting liquid and gas to flow from the inward compartment to the outward compartment and temperature-responsive valve means associated with the third bypass for closing the third bypass when the temperature of the gas spring is less than a predetermined temperature and opening the third bypass when the temperature of the gas spring is greater than a predetermined temperature.

2. A gas spring according to claim 1 and further characterized in that the third bypass opens at a port into the inward compartment and the temperature-responsive valve means includes a bimetallic element associated with the port such as to cover and uncover the port in response to the temperature of the bimetallic element.

3. A gas spring according to claim 2 and further characterized in that the third bypass extends through a portion of the piston rod adjacent the piston and the port is at an end of the third bypass.

4. A gas spring according to claim 3 and further characterized in that the port is within a cup-like valve support attached to the piston rod, the bimetallic element is a disk mounted on a flange portion of the support and the third bypass includes at least one opening in the support in a portion of the support between the disk and the port.

5. A gas spring according to claim 1 and further characterized in that a valve body is joined to a face of the piston facing the inward compartment, the third bypass includes a passage through the piston and the valve body that opens at a port in a face of the valve body, and the temperature-responsive valve means includes a bimetallic element, said bimetallic element being an elongated band having a first end and a second end, the first end of the band being secured to the valve body at a location remote from the port, and the valve means further includes a seal element at positioned to seat in sealing relation against a surface of the valve body the second end of the band adjacent the port.

6. A gas spring according to claim 5 and further characterized in that the surface of the valve body against which the seal element seats is oriented obliquely to the central longitudinal axis of the cylinder member and is located proximate to one side of the cylinder member and the bimetallic element extends substantially diametrically of the cylinder member obliquely to the central longitudinal axis of the cylinder member.

7. A gas spring according to claim 5 and further characterized in that the third bypass includes a one-way valve arranged to prevent fluid flow from the outward compartment to the central longitudinal inward compartment.

8. A gas spring according to claim 5 and further characterized in that the second bypass includes a passage through the piston and the valve body opening at a port in a wall of the valve body in the inward compartment and the spring-biassed one way valve is received within a portion of the passage within the valve body portion of the support.

9. A gas spring according to claim 5 and further characterized in that the surface of the valve body against which the seal element seats is oriented substantially parallel to the axis of the cylinder member and the bimetallic element extends substantially parallel to the central longitudinal axis of the cylinder member.

10. A gas spring according to claim 9 and further characterized in that a cap member is mounted on the valve body so as to cover the bimetallic element while permitting movement thereof between a position at which the port is covered and a position at which the port is uncovered.

11. A gas spring according to claim 9 and further characterized in that the surface of the valve body against which the seal element seats is substantially aligned with the axis of the cylinder member.

12. A gas spring according to claim 9 and further characterized in that the second bypass comprises a passage extending through the piston and the valve body opening to the inward compartment through a wall of the valve body, the spring-biased one way valve is received within a portion of the passage within the valve body, and the third bypass comprises a transverse passage in the valve body leading from the second bypass passage to the surface of the valve body against which the seal element of the bimetallic band seats.

13. A gas spring comprising a cylinder member defining a chamber, a closure at one end of the cylinder member, a piston rod received in sealed relation to the cylinder member at the other end of the cylinder member and movable toward and away from the closure, a piston affixed to the piston rod within the chamber and separating the chamber into an inward compartment adjacent said one end of the cylinder member and an outward compartment adjacent said other end of the cylinder member, the volumes of the compartments varying in accordance with the position of the piston in the chamber, a mass of a liquid and a mass of gas under a pressure higher than atmospheric pressure contained in the chamber, means defining a first bypass for allowing the liquid and gas to flow from the outward compartment to the inward compartment when the piston and rod move toward the outward compartment in response to forces imposed on the rod, means defining a second bypass for permitting the gas and liquid to flow from the inward compartment to the outward compartment upon movement of the rod toward the inward compartment, a spring-biassed one-way valve associated with the second bypass for preventing flow therethrough when the difference between the pressure of the liquid and gas in the inward compartment and the pressure of the liquid and gas in the outward compartment is less than a predetermined amount, and temperature-responsive valve means for closing the first bypass to flow of liquid and gas from the inward compartment to the outward compartment when the temperature of the gas spring is less than a predetermined temperature and opening said first bypass when the temperature of the gas spring is greater than a predetermined temperature.

14. A gas spring according to claim 13 wherein said temperature-responsive valve means permits fluid flow from the outward compartment to the inward compartment, thereby to permit outward movement of the piston rod, at all temperatures.

15. A gas spring according to claim 14 wherein said first bypass opens at a port into the inward compartment and the temperature-responsive valve means includes a bimetallic element and a seal element associated with the port such as to cover and uncover the port in response to the temperature of the bimetallic element.

16. A gas spring according to claim 15 wherein a valve body is joined to a face of the piston facing the inward compartment, the first bypass includes a passage through the piston and the valve body that opens at a port in a face of the valve body, and the temperature-responsive valve means includes an elongated bimetallic band secured at one end to the valve body at a location remote from the port and having the seal element at its other end positioned to seat in sealing relation against a surface of the valve body adjacent the port.

17. A gas spring according to claim 16 wherein the second bypass comprises a passage extending axially through the piston and the valve body opening to the inward compartment through a face of the valve body, the spring-biased one way valve is received within a portion of the passage within the valve body, and the first bypass comprises a transverse passage in the valve body leading from the second bypass passage to the port.

* * * * *